US008083365B2

(12) United States Patent
Cohen et al.

(10) Patent No.: US 8,083,365 B2
(45) Date of Patent: Dec. 27, 2011

(54) HELMET MOUNTED LIGHTING SYSTEM

(76) Inventors: Howard G. Cohen, Las Vegas, NV (US); Axel Weller, Las Vegas, NV (US)

( * ) Notice: Subject to any disclaimer, the term of this patent is extended or adjusted under 35 U.S.C. 154(b) by 0 days.

(21) Appl. No.: 12/553,772

(22) Filed: Sep. 3, 2009

(65) Prior Publication Data
US 2011/0051400 A1 Mar. 3, 2011

(51) Int. Cl.
*F21V 21/08* (2006.01)
(52) U.S. Cl. .......... 362/106; 362/103; 362/105
(58) Field of Classification Search ......... 362/106, 362/103, 105
See application file for complete search history.

(56) References Cited

U.S. PATENT DOCUMENTS

| 4,760,373 A | 7/1988 | Reilly |
| 4,862,331 A | 8/1989 | Hanabusa |
| 4,891,736 A | 1/1990 | Gouda |
| 4,956,752 A | 9/1990 | Foglietti |
| 5,040,099 A | 8/1991 | Harris |
| 5,704,707 A * | 1/1998 | Gebelein et al. ............. 362/106 |
| 5,910,764 A | 6/1999 | Hayden |
| 6,406,168 B1 * | 6/2002 | Whiting ........................ 362/473 |
| 6,784,795 B1 * | 8/2004 | Pories et al. .................. 340/479 |
| 6,982,633 B2 | 1/2006 | Burdick |
| 7,109,857 B2 | 9/2006 | Ross, Jr. et al. |
| 7,221,263 B2 | 5/2007 | Moore et al. |
| 7,264,368 B2 * | 9/2007 | Sherring ........................ 362/105 |
| 7,455,139 B2 | 11/2008 | Lee |
| 7,667,586 B2 * | 2/2010 | Cheng ........................... 340/475 |
| 2003/0137413 A1 * | 7/2003 | Morse .......................... 340/468 |
| 2006/0232955 A1 * | 10/2006 | Labine .......................... 362/105 |
| 2007/0285221 A1 | 12/2007 | Howe et al. |
| 2008/0084688 A1 * | 4/2008 | White ........................... 362/105 |
| 2009/0021365 A1 | 1/2009 | Hurwitz |
| 2009/0257217 A1 * | 10/2009 | Harris .......................... 362/105 |

* cited by examiner

*Primary Examiner* — Evan Dzierzynski
(74) *Attorney, Agent, or Firm* — Greenberg Traurig

(57) ABSTRACT

A helmet lighting system includes a housing configured for attachment to a helmet wherein a lighting module includes a power source, plurality of light sources, signal receiving means configured to receive operational signals from one or more associated vehicles and a controller configured to selectively control the plurality of light sources responsive to said signal receiving means receiving said operational signals. In this manner, the lighting module may mimic brake lights and strobe lights associated with a motorcycle for example thereby rendering the motorcycle and rider more visible. Flexible ends of the housing allow the housing to attach securely to different helmet styles. Alternatively the lighting module may be integrated with the helmet. An emergency mode allows the helmet to be used as a warning device.

15 Claims, 7 Drawing Sheets

US 8,083,365 B2

HELMET MOUNTED LIGHTING SYSTEM

FIELD OF THE INVENTION

The embodiments of the present invention relate to a helmet lighting system to increase safety for riders of motorcycles and similar vehicles.

BACKGROUND

Motorcycle riders are very vulnerable to injury or death. Riders of bicycles and similar vehicles are also very vulnerable to injury and death. To increase rider safety, many states have implemented laws requiring riders to wear helmets. Even without laws, prudent riders wear helmets. Despite the requirement and popularity of helmets, motorcycle rider deaths routinely exceed 4500 per year and continue to increase despite a decrease in total vehicle related deaths.

Therefore, there is a need for an improved helmet to decrease the likelihood of incidents or accidents involving motorcycles and similar vehicles.

SUMMARY

Accordingly, a first embodiment of the present invention is a lighting module comprising: a housing configured for attachment to a helmet, said housing having flexible ends for accommodating different helmet styles; a power source; a plurality of light sources; signal receiving means configured to receive operational signals from one or more associated vehicles; and a controller in communication with said plurality of light sources, said controller configured to selectively control said plurality of light sources responsive to said signal receiving means receiving said operational signals.

Another embodiment of the present invention is a helmet comprising: an outer surface and inner surface, said inner surface defining a space for receiving a portion of the head of a user; a light module integrated on said outer surface at a rear location of said helmet, said light module including a power source, plurality of light sources, signal receiving means configured to receive operational signals from one or more associated vehicles and a controller in communication with said plurality of light sources, said controller configured to selectively control said plurality of light sources responsive to said signal receiving means receiving said operational signals; and wherein said light module has an air-foil cross-section.

A helmet lighting system comprising: a housing configured for attachment to a helmet, said housing having flexible ends for accommodating different helmet styles; a power source; a plurality of light sources; signal receiving means configured to receive operational signals from one or more associated vehicles; signal transmitting means configured to transmit operational signals from one or more associated vehicles responsive to rider actions; and a controller in communication with said plurality of light sources, said controller configured to selectively control said plurality of light sources responsive to said signal receiving means receiving said operational signals.

The embodiments of the present invention create more visibility for riders of motorcycles, bicycles and similar vehicles by generating running and brake lights on the helmet of a rider. In one embodiment of the present invention, a helmet fitted with a lighting module may be turned to an emergency mode and used akin to a road flare to warn others of a disabled vehicle or similar trouble on a roadway. In another embodiment, the lighting module is configured for use by police officers on motorcycles such that the lighting module works in a strobe state.

Other variations, embodiments and features of the present invention will become evident from the following detailed description, drawings and claims.

DETAILED DESCRIPTION

Figure 1:
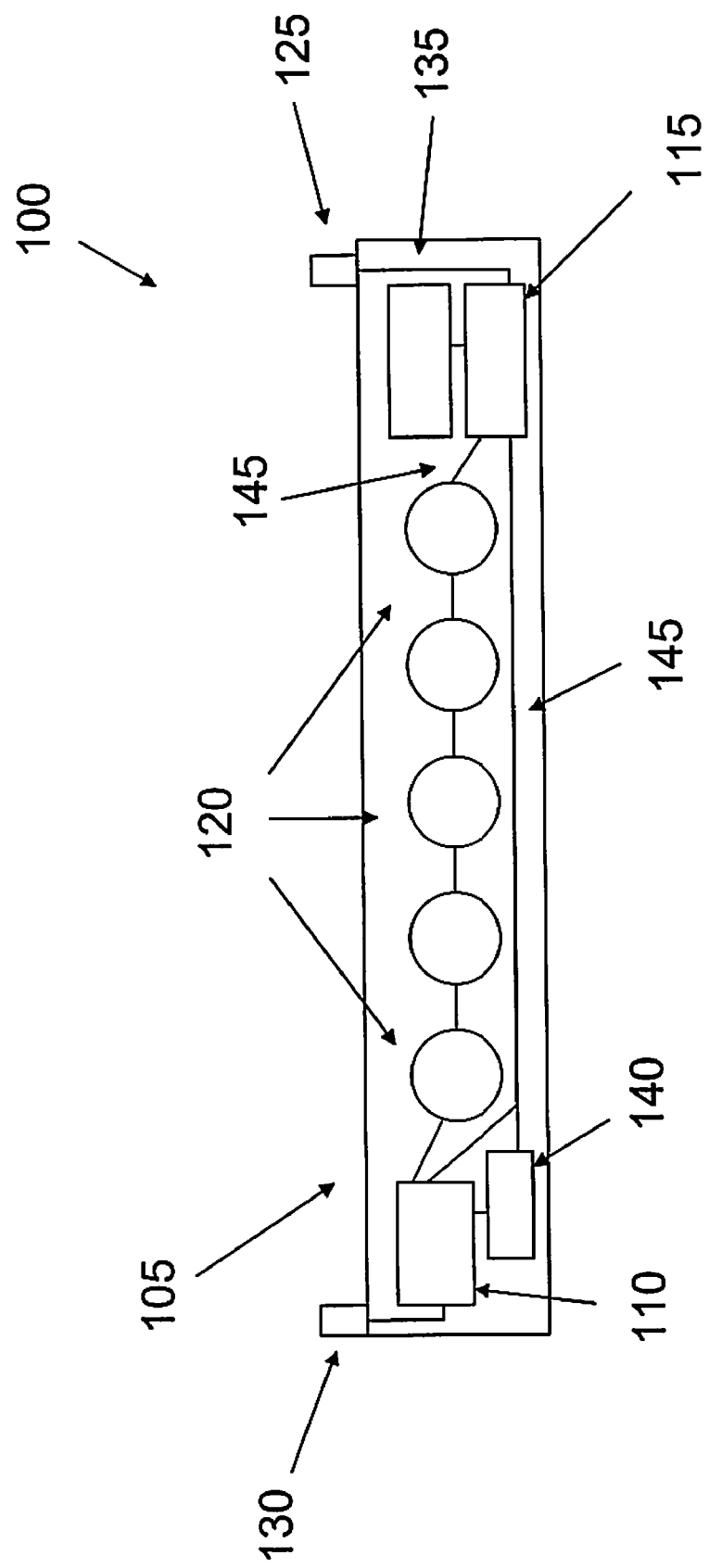
FIG. 1 illustrates a block diagram detailing various components of a lighting module according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention relate to making riders of certain vehicles (e.g., motorcycles) more visible to other traffic. Those skilled in the art will recognize that riders of many types of vehicles may benefit from the embodiments of the present invention. However, while the embodiments of the present invention may be suitable for many vehicle types, the detailed disclosure herein focuses on motorcycle riders.

FIG. 1 shows a block diagram 100 detailing various components of a lighting module according to the embodiments of the present invention. The lighting module 105 includes a controller 110, a power source 115, series of light sources 120, on-off switch 125, emergency mode switch 130, motion detector or sensor 135 and transceiver 140. As shown, the components are connected using wired connections 145 but such connections may also be wireless. The controller 110 may be any type of microprocessor or similar device suitable to control the basic operations of the lighting module 105. The power source 115 may be one or more conventional batteries, rechargeable batteries, rechargeable power source, or solar converter means. In one embodiment, because of lower power requirements and high brightness levels, the series of light sources 120 comprise light emitting diodes (LEDs). Other light sources may be used as well. The on/off switch 125 and emergency mode switch 130 are conventional in nature and, as set forth below, allow a user to turn the lighting module on and off and switch to an emergency mode when needed. The motion detector 135 may be an accelerometer, vibration sensor, micro electro-mechanical sensor or similar device to detect movement of the lighting module 105. The transceiver 140 may also be a transmitter-receiver or similar devices, including multiple components allowing the lighting module 105 to communicate with a vehicle system to which it is linked. In one embodiment, the transceiver 140 is wireless such that is communicates with the vehicle system wirelessly. It can be wired as well.

Figure 2:
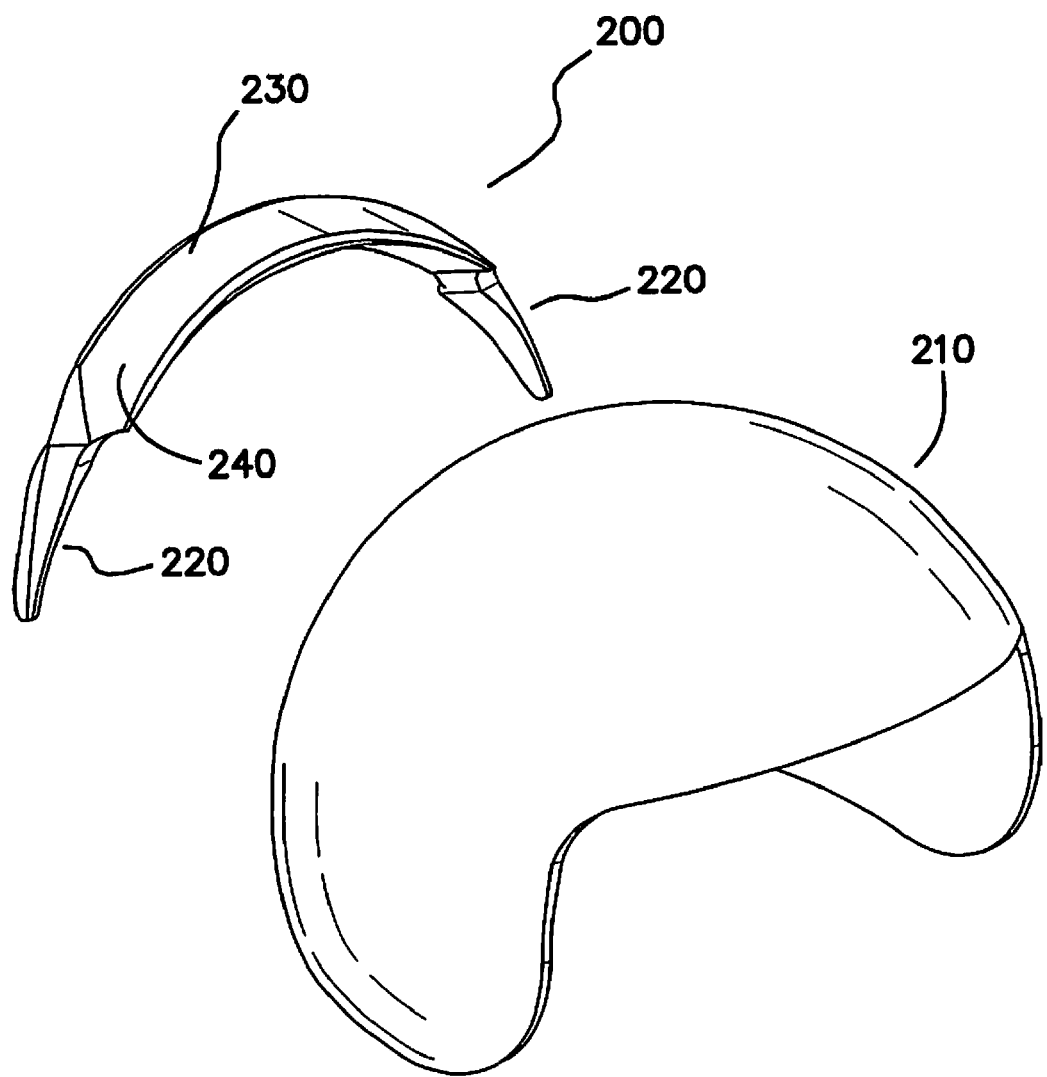
FIG. 2 illustrates a perspective view of a lighting module positioned adjacent to a motorcycle helmet according to the embodiments of the present invention.
Figure 3:
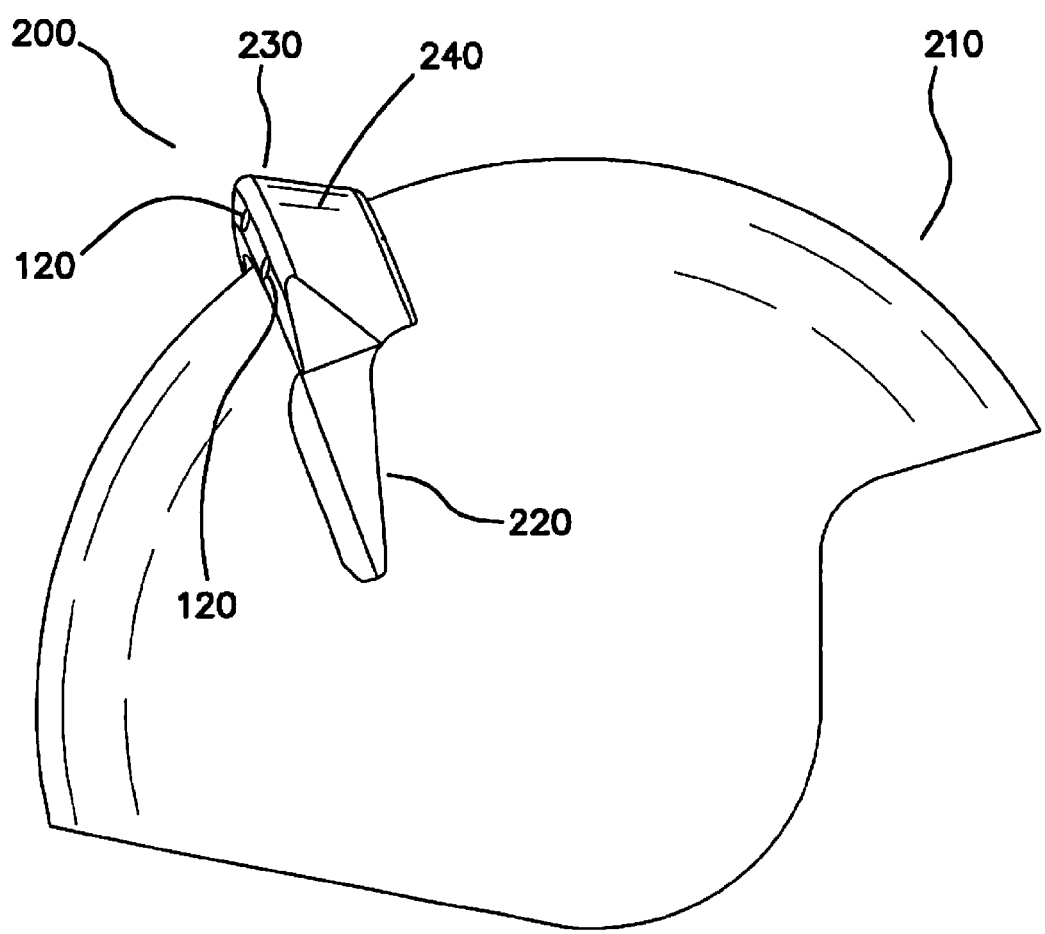
FIG. 3 illustrates a side view of the lighting module affixed to a motorcycle helmet according to the embodiments of the present invention.

FIG. 2 shows a perspective view of a lighting module 200 adjacent to a motorcycle helmet 210 to which it may be affixed as shown in the side view of FIG. 3. In one embodiment, the lighting module 105 is fabricated of a rigid material (e.g., plastic, composite, metal alloy, etc.) to withstand environmental conditions. In one embodiment, ends 220 of the lighting module 200 are either configured to be flexible or fabricated of a flexible material. Configuring the ends 220 comprises fabricating the ends 220 of such a thickness that the ends 220 become flexible. Alternatively, the material used to fabricate the ends 220 is flexible. The flexibility of the ends 220 permits the lighting module 200 to fit snugly on different helmet types and designs. Between the ends 220, is a housing 230 which contains the components, as shown in FIG. 1. The housing 230 is configured as an air foil to maintain an aerodynamic air flow associated with the motorcycle helmet 210. As such an upper surface 240 of the housing 230 slopes upward to direct air flow off the motorcycle helmet 210 thereby reducing turbulence and creating an aerodynamic helmet/lighting module combination.

Figure 4:
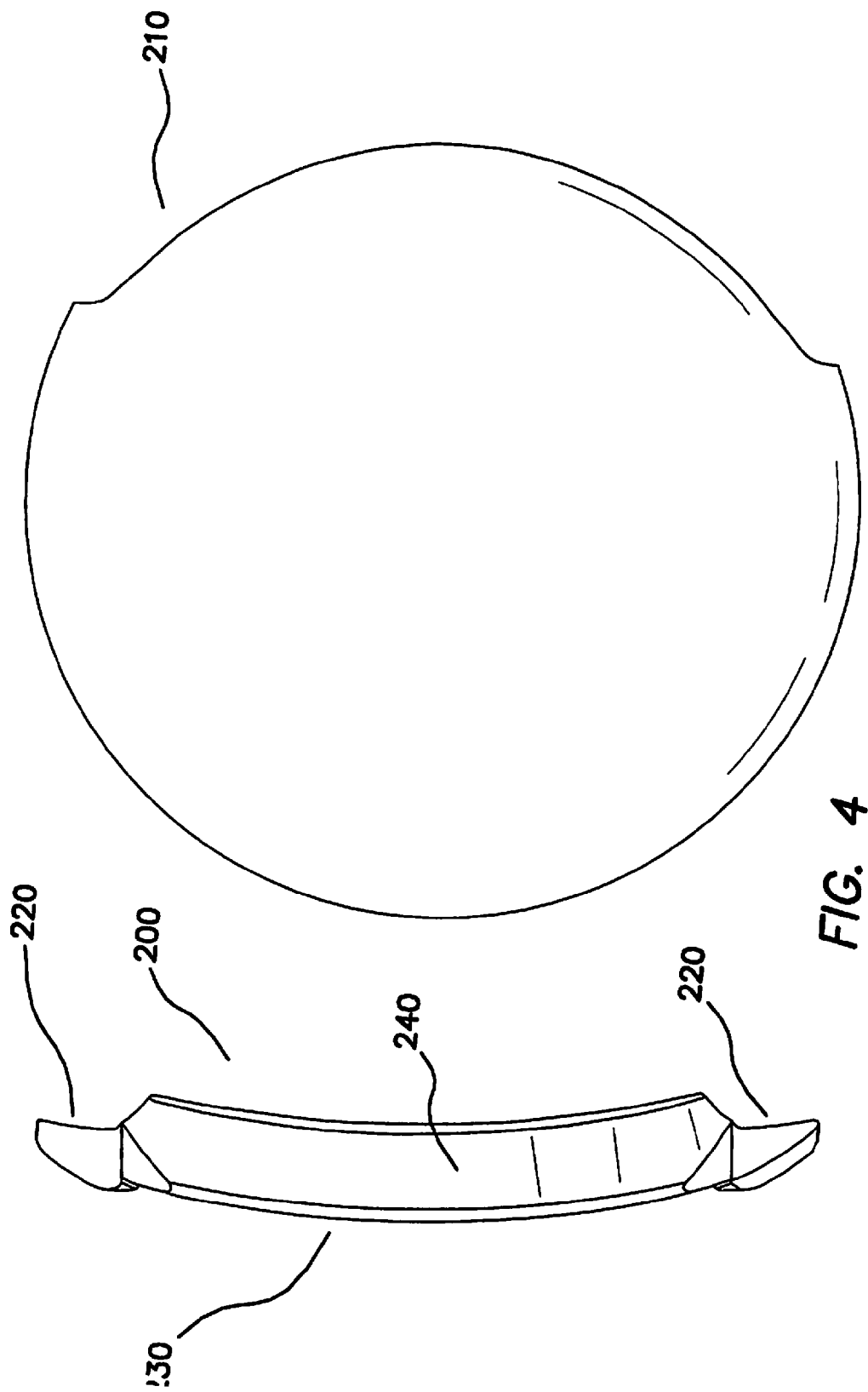
FIG. 4 illustrates an upper view of the lighting module positioned adjacent to a motorcycle helmet according to the embodiments of the present invention.
Figure 5:
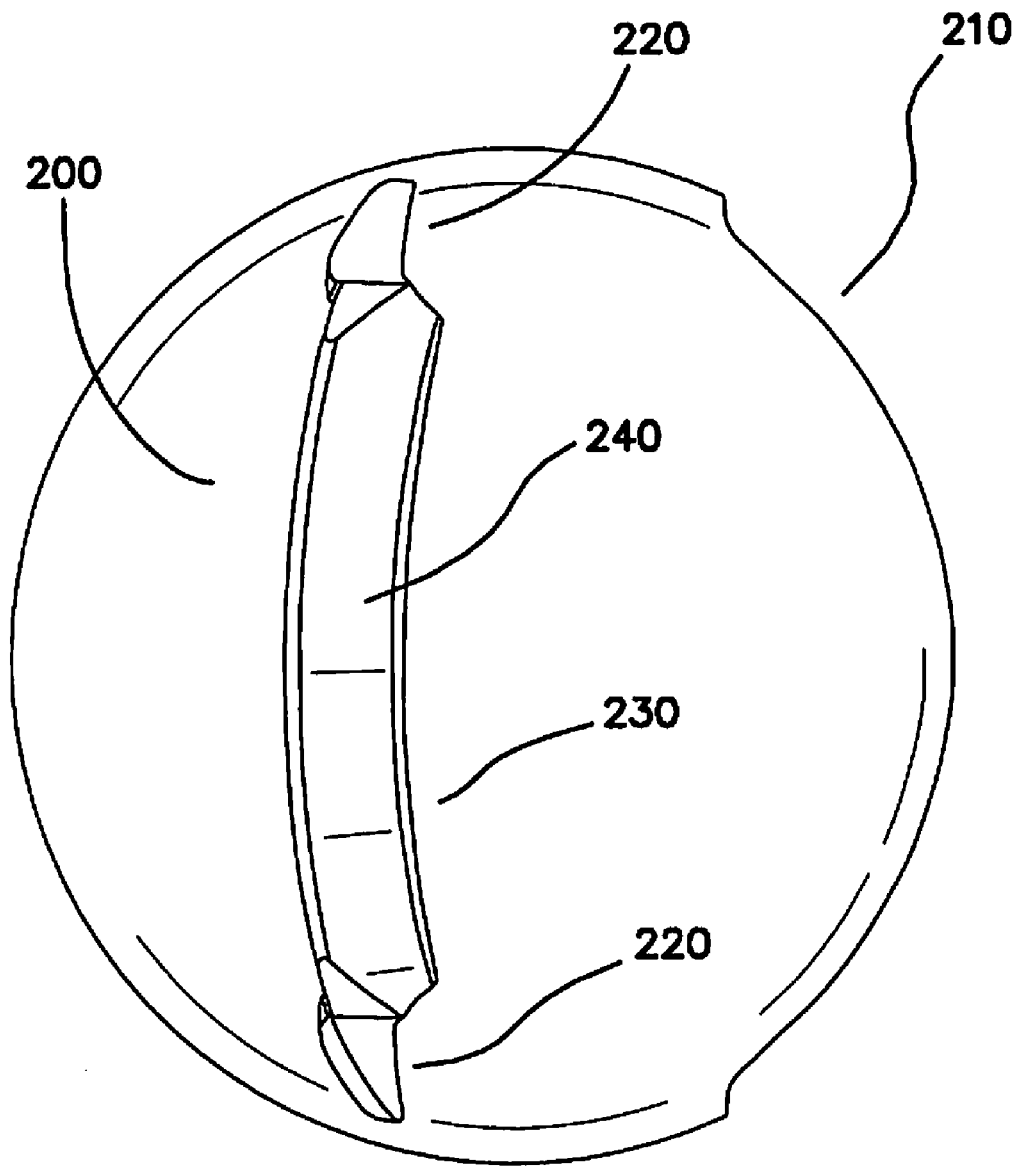
FIG. 5 illustrates an upper view of the lighting module affixed to a motorcycle helmet according to the embodiments of the present invention.
Figure 6:
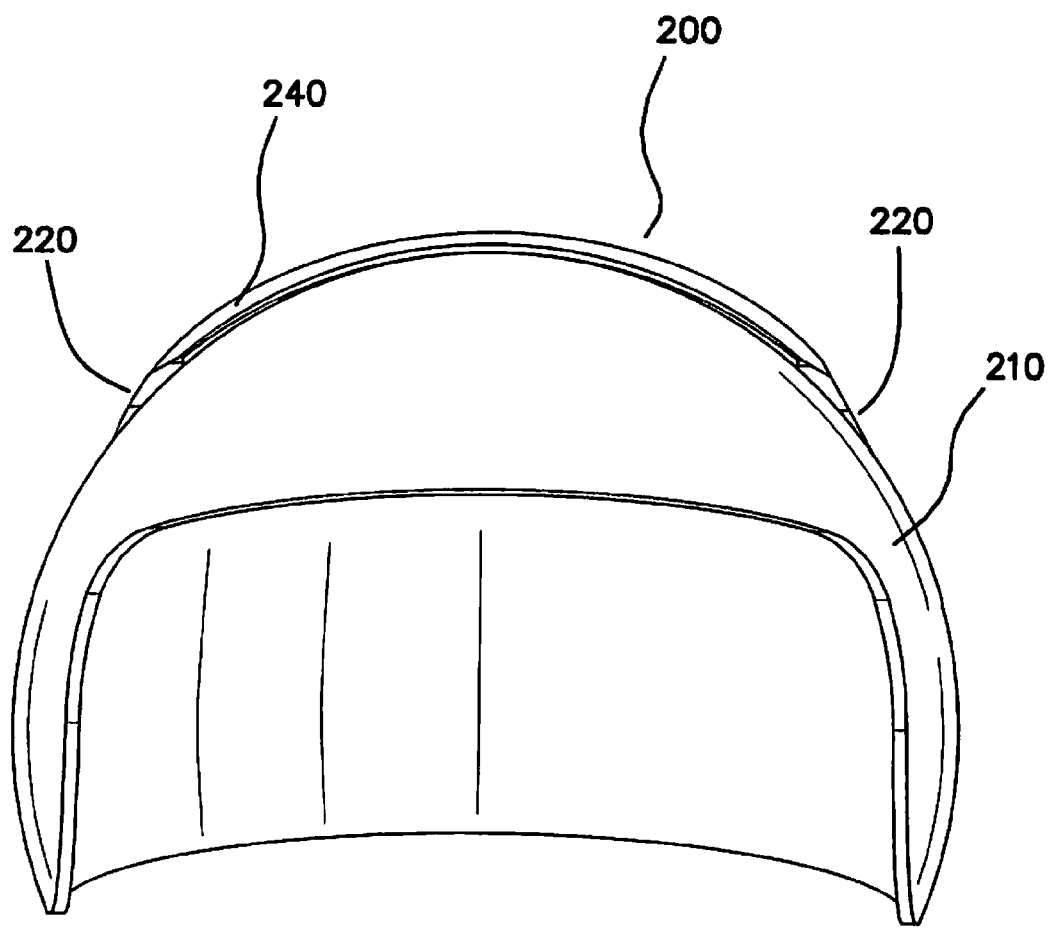
FIG. 6 illustrates a front view of the lighting module affixed to a motorcycle helmet according to the embodiments of the present invention.

FIGS. 4 and 5 show upper views of the lighting module 200 adjacent to, and affixed to, the rear portion of the motorcycle helmet 210. The lighting module 200 may be affixed to the motorcycle helmet 210 using adhesives, mechanical fasteners (e.g., rivets, screws), magnets or other affixation means. In another embodiment, the lighting module 200 is fabricated integral with the motorcycle helmet 210 such that the lighting module 200 and motorcycle helmet 210 are a single integral unit. LEDs 240 are viewable through rear openings in the housing 230. FIG. 6 shows a rear view of the lighting module 200 attached to the helmet 210 with the light sources 250 (e.g., LEDs) visible.

Figure 7:
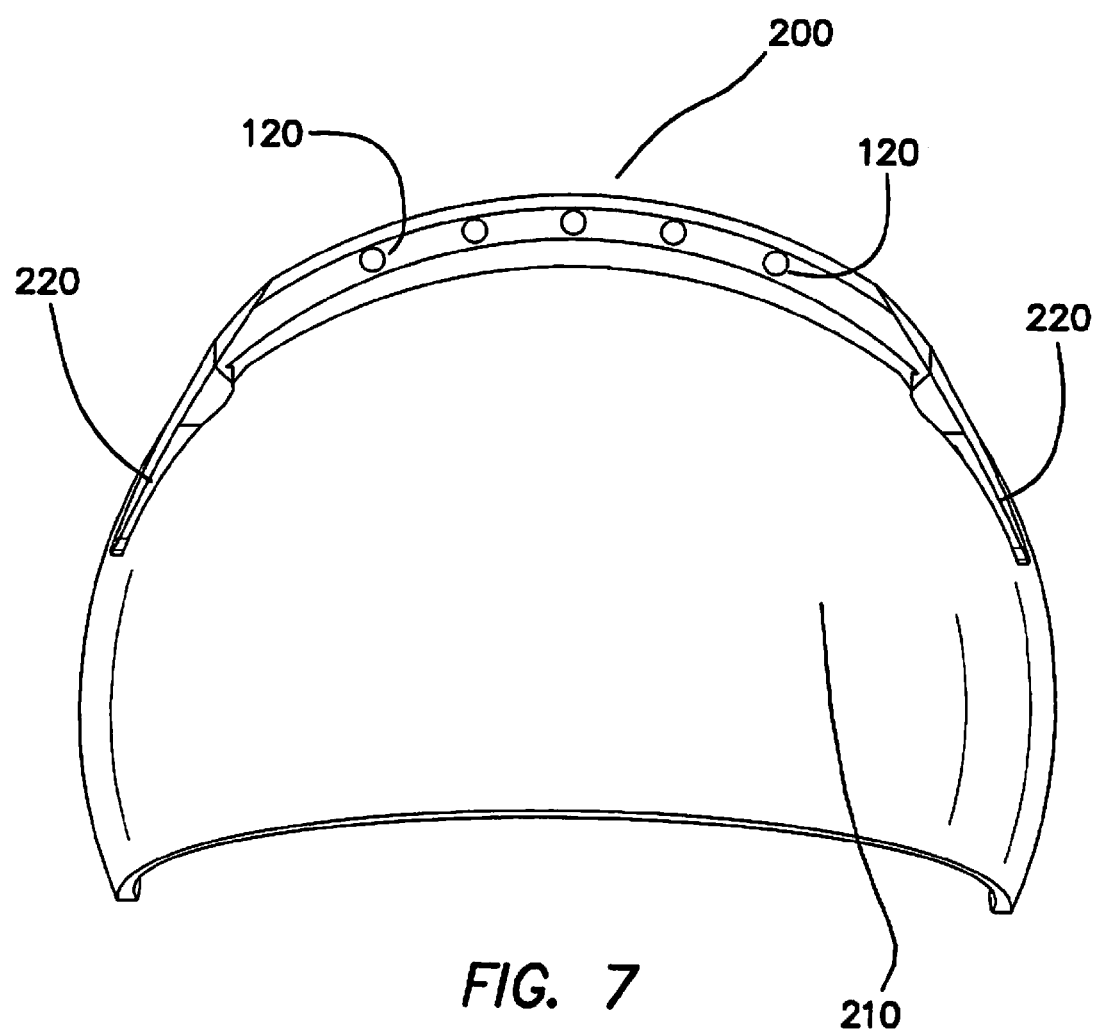
FIG. 7 illustrates a rear view of the lighting module affixed to a motorcycle helmet according to the embodiments of the present invention.

FIGS. 6 and 7 show front and rear views of the lighting module 200 affixed to the motorcycle helmet 210. The front view of FIG. 6 shows the lighting module 200 positioned such that the air flow over the helmet 210 is deflected upward by the upper surface 240 thereby reducing drag. The light sources 120 are visible in FIG. 7. While a single row of five light sources 120 is shown, those skilled in the art will recognize that more or less light sources 120 may be used and the light sources 120 may be configured in multiple rows, columns or other designs.

In practice, the lighting module 200 is linked with the motorcycle's braking system to trigger the illumination of red LEDs in the lighting module 200. The link is provided via a transmitter or transceiver (not shown) installed on the motorcycle. The transceiver or transmitter is connected to the brake system of the motorcycle such that the transceiver or transmitter generates a wireless signal responsive to the brakes of the motorcycle being activated. Once the wireless signal is detected by the transceiver or receiver 140 of the lighting module 200, the red LEDs are illuminated to alert others that the motorcycle is slowing. In one embodiment, the transceiver or receiver 140 is linked by frequency with the transceiver or transmitter installed on the motorcycle. One transceiver or receiver 140 may also link to various motorcycle transceivers or transmitters (having the same or different frequencies) allowing a single helmet 210 to be used with multiple motorcycles. In another embodiment, the lighting module 200 can be programmed by the user to link to multiple frequencies (e.g., 5) such that the lighting module 200 may be used with multiple vehicles. For example, the helmet with the affixed lighting module 200 may be used with 5 different motorcycles which transmit five different frequencies. In one such embodiment, the lighting module 200 is pre-programmed to link with multiple transmitters provided with the lighting module 200. In another embodiment, the user is responsible to link the lighting module 200 and multiple transmitters using user input means integrated with the lighting module 200.

Between braking, the lighting module 200 may be dormant or may display running lights to cause the motorcycle rider to be more visible at all times. The running lights are generated by yellow LEDs in the lighting module 200. In one embodiment, the lighting module 200 contains both red and yellow LEDs. Alternatively, multi-color LEDs may be used.

In one embodiment, the helmet 200 may be used as an emergency warning device. In this embodiment, the emergency mode switch 130 is switched to the on position causing the LEDs to flash intermittently. While in the emergency mode the helmet 210 may be placed on or near a disabled vehicle in the road or shoulder to warn others of the disabled vehicle.

In another embodiment, the lighting module 200 is configured for use with motorcycles used by municipal police departments. In this embodiment, the lighting module 200 includes the brake light and optional running light mode detailed above but also includes a strobe mode. The strobe mode is triggered responsive to activation of the emergency strobe lights of the police motorcycle. In this manner, the police motorcycle becomes more visible with the helmet module in strobe mode.

In one embodiment, the motion sensor 135 is configured to detect helmet movement. Responsive to non-movement for a pre-established period of time (e.g., 5 minutes), the controller 110 triggers the lighting module 105 to turn off in order to save power.

Although the invention has been described in detail with reference to several embodiments, additional variations and modifications exist within the scope and spirit of the invention as described and defined in the following claims.

We claim:

1. A light module comprising:
   a housing configured for attachment to an upper portion of a helmet such that said housing extends between a left and right side of said helmet, said housing having a rigid body and flexible end portions for accommodating different helmet styles, said housing configured with an upward sloping face for deflecting air thereover;
   a power source;
   a plurality of light sources;
   signal receiving means configured to receive operational signals from one or more associated vehicles;
   an emergency mode switch which when switched on causes the plurality of light sources to flash in a pre-established sequence; and
   a controller in communication with said plurality of light sources, said controller configured to selectively control said plurality of light sources responsive to said signal receiving means receiving said operational signals.

2. The light module of claim 1 wherein said power source is solar-based.

3. The light module of claim 1 wherein said plurality of light sources are multi-color light emitting diodes.

4. The light module of claim 1 further comprising a motion sensor.

5. The light module of claim 1 wherein said operational signals include brake signals and strobe signals.

6. A helmet comprising:
an outer surface and inner surface, said inner surface defining a space for receiving a portion of the head of a user;
a light module integrated on said outer surface at a rear location of said helmet, said light module including a power source, plurality of light sources, signal receiving means configured to receive operational signals from one or more associated vehicles and a controller in communication with said plurality of light sources, said controller configured to selectively control said plurality of light sources responsive to said signal receiving means receiving said operational signals;
an emergency mode switch which when switched on causes the plurality of light sources to flash in a pre-established sequence; and
wherein said light module includes a housing configured for attachment to an upper portion of a helmet such that said housing extends between a left and right side of said helmet, said housing having a rigid body and flexible end portions for accommodating different helmet styles, said housing configured with an upward sloping face for deflecting air thereover.

7. The helmet of claim 6 wherein said power source is solar-based.

8. The helmet of claim 6 wherein said plurality of light sources are multi-color light emitting diodes.

9. The helmet of claim 6 further comprising a motion sensor configured to automatically switch off the light module responsive to a lack of helmet motion for a pre-established time period.

10. The helmet of claim 6 wherein said operational signals include brake signals and strobe signals.

11. A helmet lighting system comprising:
a housing configured for attachment to an upper portion of a helmet such that said housing extends between a left and right side of said helmet, said housing having a rigid body and flexible end portions for accommodating different helmet styles, said housing configured with a upward sloping face for deflecting air thereover;
a power source;
a plurality of light sources;
signal receiving means configured to receive operational signals from one or more associated vehicles;
signal transmitting means configured to transmit operational signals from one or more associated vehicles responsive to rider actions;
an emergency mode switch which when switched on causes the plurality of light sources to flash in a pre-established sequence; and
a controller in communication with said plurality of light sources, said controller configured to selectively control said plurality of light sources responsive to said signal receiving means receiving said operational signals.

12. The system of claim 11 wherein said power source is solar-based.

13. The system of claim 11 wherein said plurality of light sources are multi-color light emitting diodes.

14. The system of claim 11 further comprising a motion sensor in said housing configured to automatically switch off the light module responsive to a lack of helmet motion for a pre-established time period.

15. The system of claim 11 wherein said operational signals include brake signals and strobe signals.

* * * * *